(12) United States Patent  (10) Patent No.: US 6,636,338 B1
Kida et al.  (45) Date of Patent: Oct. 21, 2003

(54) IMAGE FORMING APPARATUS

(75) Inventors: Hiroshi Kida, Yamatokoriyama (JP); Koji Wakamoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 120 days.

(21) Appl. No.: 09/717,114

(22) Filed: Nov. 22, 2000

(30) Foreign Application Priority Data

Nov. 24, 1999 (JP) .......................................... P11-332278

(51) Int. Cl.⁷ .............................................. G02B 26/08
(52) U.S. Cl. ..................... 359/196; 399/107; 399/110
(58) Field of Search ................................ 359/196–198; 347/256–257, 263; 399/107, 110

(56) References Cited

U.S. PATENT DOCUMENTS

| 4,914,484 A | 4/1990 | Kida |
| 5,971,394 A | 10/1999 | Kida et al. |
| 6,259,872 B1 * | 7/2001 | Fukunaga et al. .......... 399/107 |

FOREIGN PATENT DOCUMENTS

| JP | 4-204857 A | 7/1992 |
| JP | 6-175419 A | 6/1994 |
| JP | 8-006336 A | 1/1996 |
| JP | 11-034392 A | 2/1999 |
| JP | 11095149 | 4/1999 |
| JP | 11-258885 A | 9/1999 |

\* cited by examiner

*Primary Examiner*—James Phan
(74) *Attorney, Agent, or Firm*—Birch, Stewart, Kolasch & Birch, LLP

(57) ABSTRACT

In an image forming apparatus for reproducing an image on an image carrier by means of a laser beam, a frame structure for supporting a laser scanning device has a basic configuration in which lower portions of front and rear frames are coupled to each other by combining square pipes. In the frame structure, a reinforcing member of a flat plate made of a rigid material is fixed to upper square pipes of the front and rear frames which is required to be reinforced. A supporting member which supports optical components constituting the laser scanning device is fixed and supported by the reinforcing member.

6 Claims, 6 Drawing Sheets

IMAGE FORMING APPARATUS

BACKGROUND OF THE INVENTION

1. Field of the Invention

The present invention relates to an image forming apparatus in which an image corresponding to image data is reproduced by scanning an image carrier with a laser beam, and more particularly to an image forming apparatus in which the strength of a frame for accommodating and holding components constituting the image forming apparatus is enhanced.

2. Description of the Related Art

In an image forming apparatus employing the electrophotographic technique, a photoconductor which serves as an image carrier is uniformly charged, and then illuminated with a light image corresponding to image data, thereby forming an electrostatic latent image on the surface of the photoconductor. As a method for forming such a light image, a method is used in vogue in which the surface of the photoconductor is scanned in the direction of the rotation axis with a modulated laser beam emitted from a semiconductor laser that is driven and controlled in accordance with image data, via an optical system in which various optical components such as reflection mirrors, a lens, and a deflection mirror (polygon mirror) are held at predetermined intervals.

Such an image forming apparatus which uses a laser scanning device having an optical scanning system including a semiconductor laser, and in which the above-described electrophotographic technique is employed so as to reproduce an image in accordance with image data has been commercialized as a printer, a digital copier, a facsimile apparatus, or the like. In such an image forming apparatus, components including an expendable item are unitized into a single assembly, and the unit assembly is configured so as to be replaced with a new one by the user, thereby allowing the user to easily perform maintenance. This can save service expenses for replacing the assembly, and hence the total cost can be reduced.

In order to reduce the market price, the cost reduction has been performed in various points. With respect to the cost of components of an apparatus, for example, the price is reduced by, for example, reconsidering the components, reducing the number of components, and improving the productivity.

The components may be reduced in number and shared so as to realize the cost reduction. In this case, the apparatus must be designed in consideration of the strength and rigidity of the apparatus body. In the case where members for supporting a laser scanning device are used also for another purpose or reduced in number, for example, the supporting structure must be considered so as not to exert an adverse effect on the laser beam scanning. When the strength and rigidity of a frame structure for supporting a laser scanning device are reduced, vibrations due to the recording operation of the electrophotographic process section or the like adversely affects the laser beam scanning to cause shake, distortion, or the like to largely disturb an reproduced image, with the result that the image quality is greatly affected.

In a recent image forming apparatus, as describe above, various expendable items are enabled to be replaced in the form of a unit with new ones. In order to facilitate the replacement, therefore, an opening for operation must be formed in a frame which serves as a supporting structure of the apparatus body. When such an opening is formed, the strength and rigidity of the frame which serves as a supporting structure are weakened, and hence the frame for supporting the laser scanning device is caused to distort or shake by vibrations due to the recording operation or the like as described above, whereby the image quality is impaired.

Japanese Unexamined Patent Publication JP-A 11-95149 (1999) discloses a configuration in which a laser scanning device is attached to a frame of the body of an image forming apparatus via an additional reinforcing member, so that effects of shake and distortion due to vibration or the like created by the laser scanning device are eliminated to prevent the laser beam scanning from being disturbed. As the reinforcing member, a member formed by a rigid material such as iron is prepared. The laser scanning device is supported by the reinforcing member, and the reinforcing member is attached and fixed to the body frame, thereby preventing vibrations, distortion, and the like of the image forming apparatus body from being transmitted to the laser scanning device. As a result, the laser beam scanning can be stabilized, and the image quality is prevented from being lowered.

In the conventional art described above, the frame body which serves per se as a supporting structure of the body of the image forming apparatus is provided with strength and rigidity, so as not to transmit vibrations created by the image forming apparatus to the laser scanning device, whereby the occurrence of shake of the optical system or disturbance of the scanning operation is prevented. In the case where the body frame itself is problematic in strength, however, there is a fear that the laser beam scanning is largely disturbed even when a reinforcing member is directly attached to the laser scanning device itself.

In order to enable the user to easily perform maintenance, particularly, several partial openings must be formed in the frame structure so as to attach and detach replacement units for various expendable items, with the result that the strength and rigidity of the frame are reduced. Accordingly in order to enhance the strength of the frame, it is necessary to increase the thickness of each member constituting the frame structure or increase the diameter of a post(s) or the like.

However, such a configuration causes increases in weight and size of the whole apparatus and accordingly causes an increase in production cost.

SUMMARY

In view of the problems discussed above, it is an object of the invention to provide an image forming apparatus in which the strength and rigidity of a frame structure for supporting a laser scanning device are enhanced, so that, when the laser scanning device is supported by the structure, disturbance of a scanning laser beam due to vibrations created by the image forming apparatus or the like is avoided, so as to prevent the image quality from being lowered.

It is another object of the invention to provide an image forming apparatus in which, even in the case where components constituting the image forming apparatus are to be easily replaced with new ones, the strength and the like of a frame structure can be sufficiently ensured, and also positional relationships between the frame structure and a laser scanning device can be satisfactorily ensured.

In order to achieve the objects, the invention provides an image forming apparatus comprising an image carrier which is optically scanned with a laser beam that is modulated in accordance with image data, for reproducing an image corresponding to the image data thereon; a laser scanning device having optical components, for scanning with the laser beam; a frame structure for supporting the image carrier and the laser scanning device, and a first reinforcing member attached to a portion where the frame structure is reinforceable in strength, for supporting the laser scanning device.

According to the invention, the configuration of the image forming apparatus makes it possible that the laser scanning device for scanning the surface of the image carrier with a laser beam in the main scanning direction is supported by the first reinforcing member which is disposed with the objective of reinforcing the frame structure that ensures a space for accommodating and holding components constituting the image forming apparatus. Therefore, it is not required to specially provide the laser scanning device with a reinforcing member for preventing shake and distortion of the laser beam due to vibrations of an image forming operation, so as to support the laser scanning device. In other words, the laser scanning device is fixed to and supported by the first reinforcing member which is previously disposed in order to reinforce the frame structure. The configuration can be simplified, and shake of the laser beam and the like can be effectively prevented.

According to the image forming apparatus of the invention, the frame structure is configured so that, when the image carrier is exposure scanned with the laser beam emitted from the laser scanning device, shake and distortion of the laser beam are prevented from occurring, and the laser scanning device is attached to the reinforcing member which is disposed with the objective of reinforcing the frame structure, thereby preventing the above-mentioned shake and distortion of the laser beam from occurring.

In the invention it is preferable that a part of the laser scanning device serves as the first reinforcing member.

According to the invention, since the first reinforcing member which constitute a part of the laser scanning device is attached to the frame structure to reinforce the frame structure, it is not required to specially provide the laser scanning device with a reinforcing member for preventing shake and distortion of the laser beam due to vibrations of an image forming operation, so as to support the laser scanning device. In other words, the frame structure is reinforced by the laser scanning device, with the result that the configuration can be simplified and shake of the laser beam and the like can be effectively prevented.

In the invention it is preferable that the laser scanning device is held by a first supporting member in which one face is opened so that predetermined mutual positional relationships among the optical components constituting the laser scanning device are maintained, and the first supporting member is fixed so that the opened face is opposed to the first reinforcing member.

According to the invention, the optical components can be easily integrated into the apparatus, and as well the first reinforcing member prevents dust from entering the first supporting member because it is fixed to the reinforcing member, whereby the optical components are prevented from being contaminated to cause the image quality to be impaired. Since the reinforcing member plays a role of a cover, it is not required to separately dispose a specific cover on the first supporting member In the invention it is preferable that the frame structure has a basic configuration in which front and rear frames each configured by combining a plurality of rod-like members are coupled with each other by rod-like members to ensure a space which can accommodate components of the image forming apparatus, and the reinforcing member is disposed between the front and rear frames.

According to the invention, the reinforcing effect of the frame structure can be enhanced.

Since the frame structure is configured by combining the rod-like members and the frame structure is reinforced by the reinforcing member, furthermore, the opening which enables the image carrier or the like to be easily replaced with a new one can be easily formed, and the strength and rigidity of the frame structure can be sufficiently ensured by thereinforcing member.

As a result, the above-mentioned positional relationships between the laser scanning device and the image carrier are prevented from being broken.

In the invention it is preferable that a second reinforcing member is further disposed in a same manner as that of the first reinforcing member, and a second supporting member for supporting the image carrier is disposed on the second reinforcing member.

According to the invention, the strength and rigidity of the frame structure of the basic configuration can be further enhanced. When, in the frame, the second supporting member is disposed on the second reinforcing member, positional relationships between the laser scanning device and the image carrier can be held constant. During a process of scanning with the laser beam in the main scanning direction, therefore, positional relationships with respect to the image carrier are held constant with the result that an image formed by excellent scanning can be obtained.

Since the second reinforcing member for reinforcing the frame structure is disposed while ensuring positional relationships with the reinforcing member (first reinforcing member) to which the laser scanning device is attached and the image carrier is supported by the second reinforcing member, moreover, predetermined positional relationships between the two components can be maintained, and images can be stably reproduced without reduction in image quality.

In the invention it is preferable that a guiding portion for guiding the second supporting member which supports the image carrier is disposed in the second reinforcing member, a guided portion which is guided by the guiding portion is disposed in the second supporting member, and the second supporting member is detachable and attachable.

According to the invention, even in the configuration in which the image carrier is attached and detached in this way, the laser scanning device and the second supporting member are respectively supported by the first and second reinforcing members, and hence relationships between the two components are always held constant, so that satisfactory image formation can be performed.

In order to enable the image carrier to be attachable and detachable, an opening must be formed in the frame structure. Since the frame structure is configured by combining rod-like members as described above, such an opening can be easily ensured. Even when such an opening is formed, furthermore, strength and rigidity can be sufficiently ensured because the strength and rigidity of the frame structure including the first reinforcing member or the second reinforcing member are sufficiently ensured.

In the invention it is preferable that the second reinforcing member is fixed to the first reinforcing member so that a face of the first reinforcing member corresponding to a laser beam scanning direction is fixed to a face of the second reinforcing member corresponding to the laser beam scanning direction.

According to the invention, positional misalignment in a scanning direction (main scanning direction) along which the surface of the image carrier is scanned with the laser beam is eliminated, and constant relationships are maintained, whereby a more excellent image can be formed. Particularly the positional relationships in the main scanning direction can be sufficiently ensured by the first and second reinforcing members.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
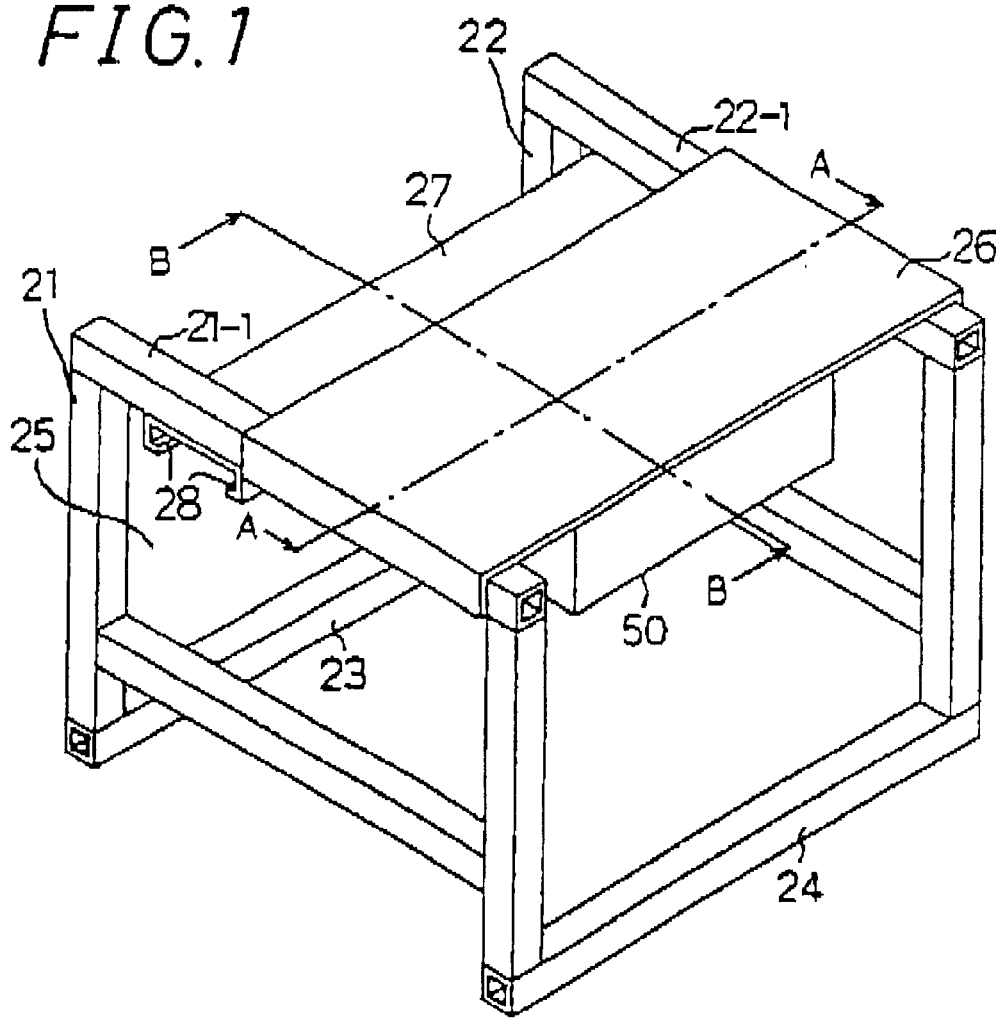
FIG. 1 is a perspective view illustrating first and second embodiments of the invention, and showing an example of a frame structure in which a space for accommodating and holding components constituting an image forming apparatus is ensured, and which is reinforced.

Now referring to the drawings, preferred embodiments of the invention are described below.

Figure 2:
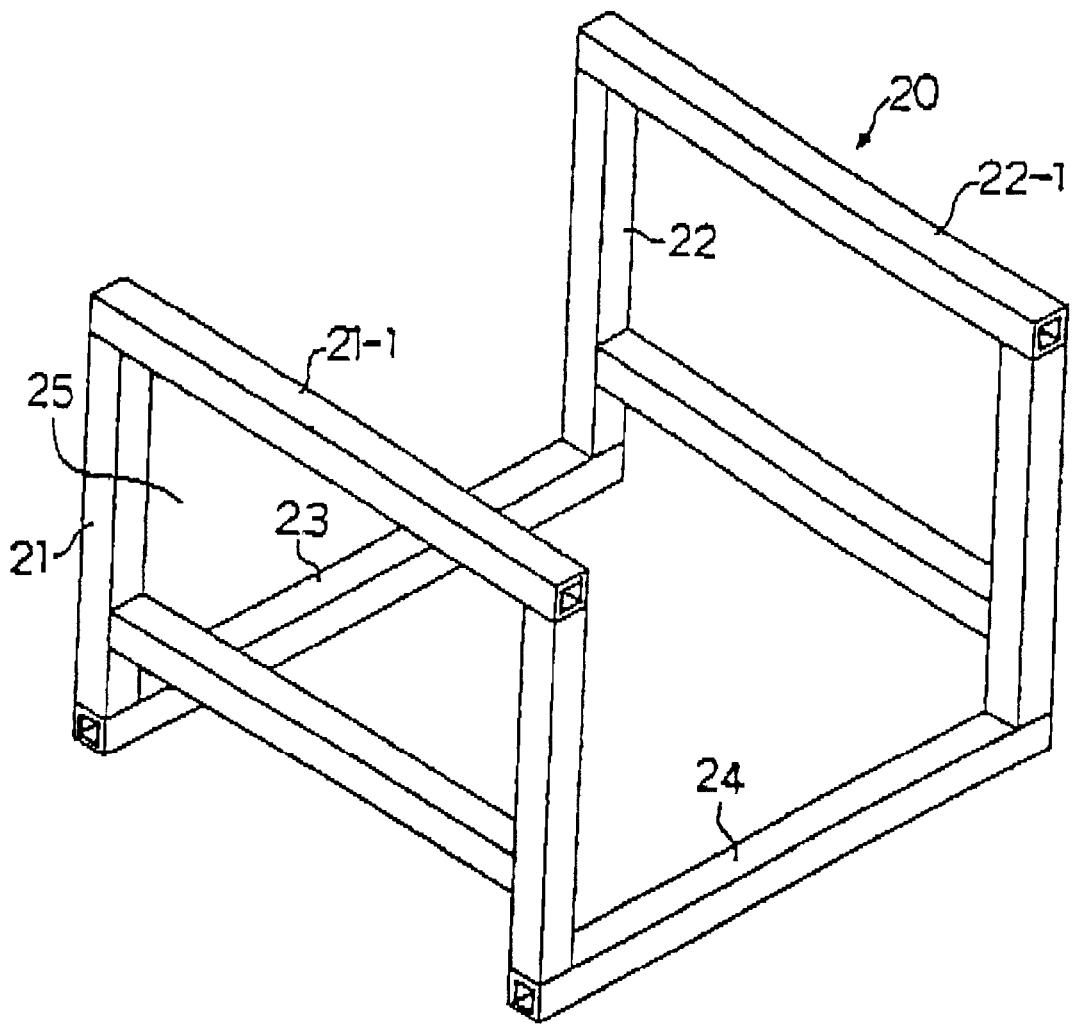
FIG. 2 is a perspective view showing the basic configuration of the frame structure in the first and second embodiments of the invention.

FIGS. 1 and 2 are perspective views illustrating an embodiment of the invention, and showing a frame configuration used in a frame structure which accommodates and holds components constituting an image forming apparatus. FIG. 1 shows a state in which the frame structure is reinforced and a laser scanning device constituting the image forming apparatus is supported by the frame structure, and FIG. 2 is a perspective view showing the basic configuration of the whole of the frame structure constituting the image forming apparatus.

Figure 3A:
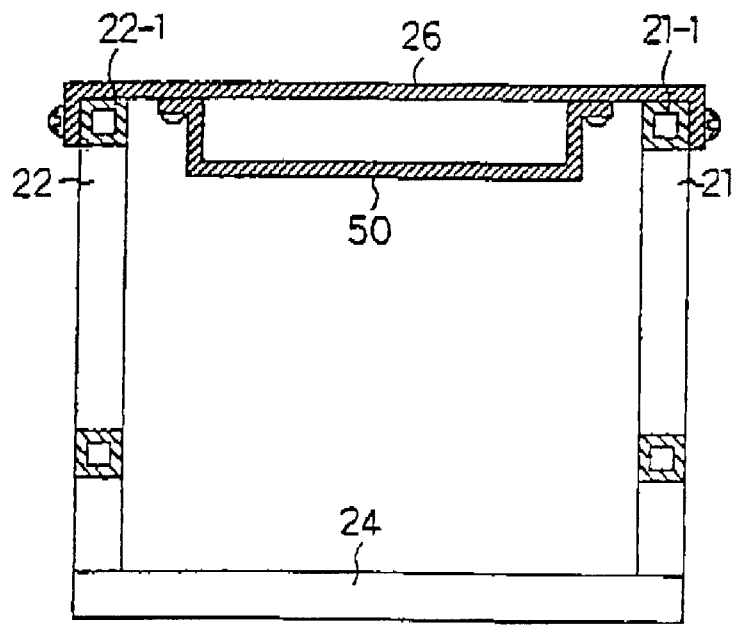
FIGS. 3A and 3B are section views of the frame structure shown in FIG. 1, FIG. 3A being a section view taken along line A—A of FIG. 1, and FIG. 3A being a section view taken along line B—B of FIG. 1.
Figure 3B:
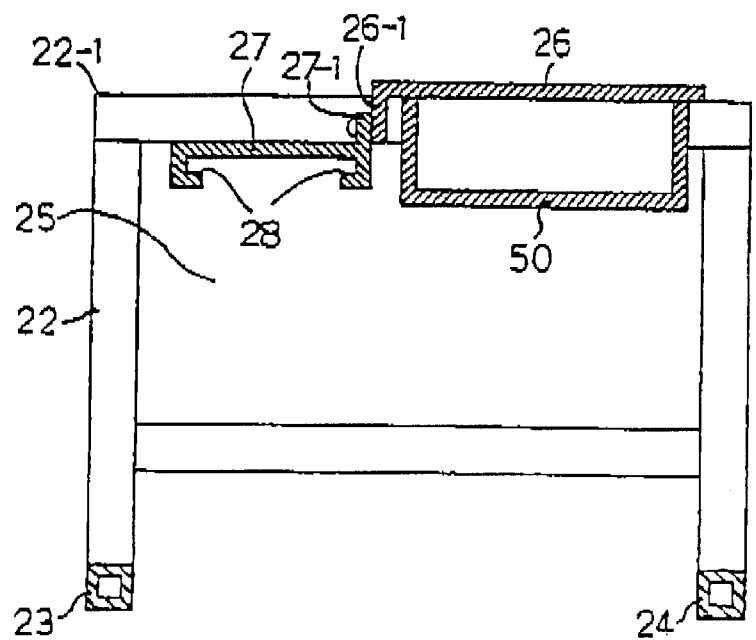
Figure 4:
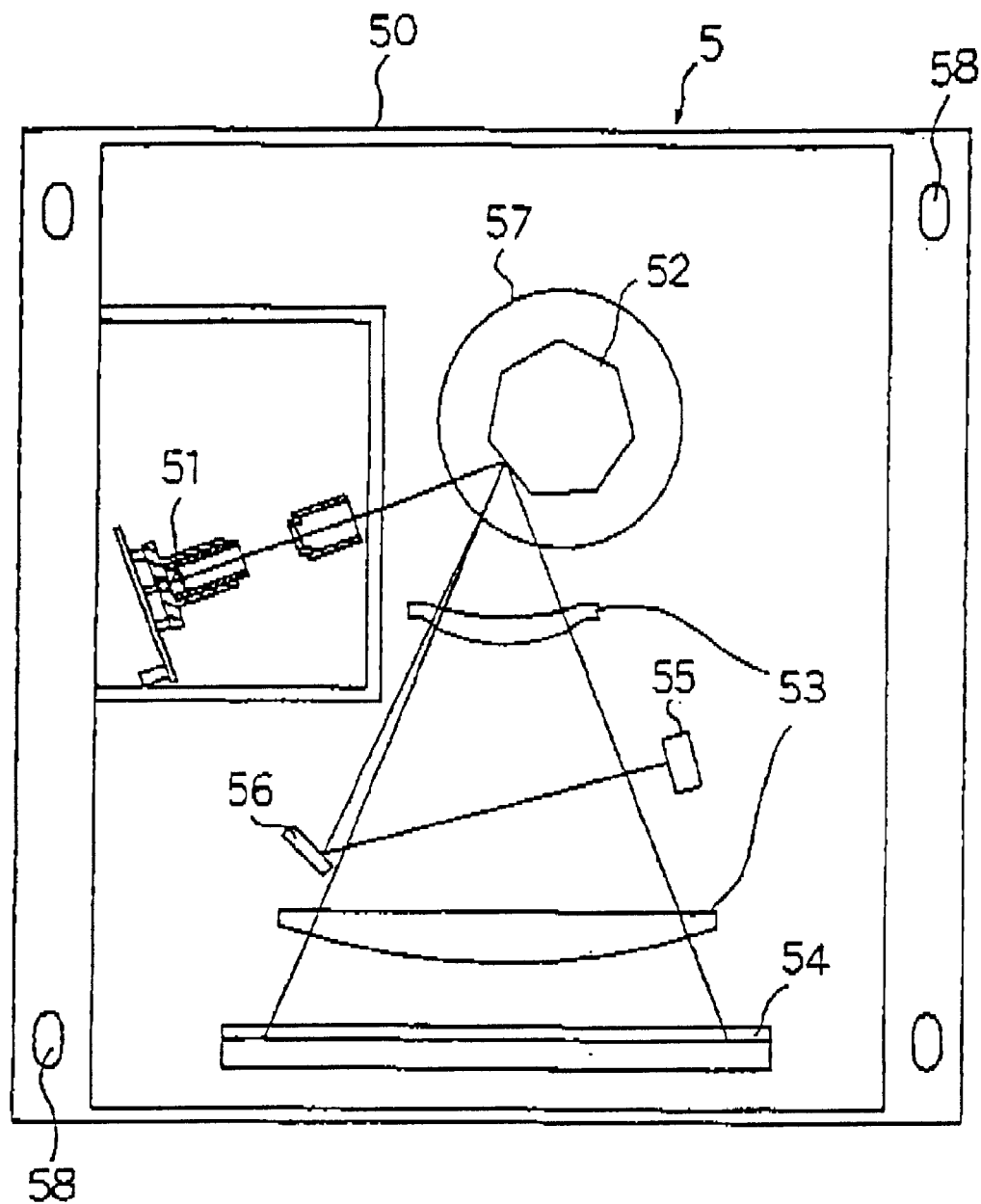
FIG. 4 is a plan view showing an arrangement of optical components of a laser scanning device which constitutes the image forming apparatus of the invention, and which emits a laser beam for writing an image on an image carrier.

FIGS. 3A and 3B are section views taken along lines in FIG. 1, FIG. 3A is a section view taken along line A—A of FIG. 1, and FIG. 3B is a section view taken along line B—B of FIG. 1. In FIGS. 3A and 3B, components including a supporting structure for the laser scanning device are shown, and optical components constituting the laser scanning device and disposed on the supporting structure are not shown. FIG. 4 is a plan view showing an arrangement in which the optical components constituting the laser scanning device and disposed on the supporting structure of the laser scanning device shown in FIGS. 3A and 3B are held at predetermined intervals.

Figure 5:
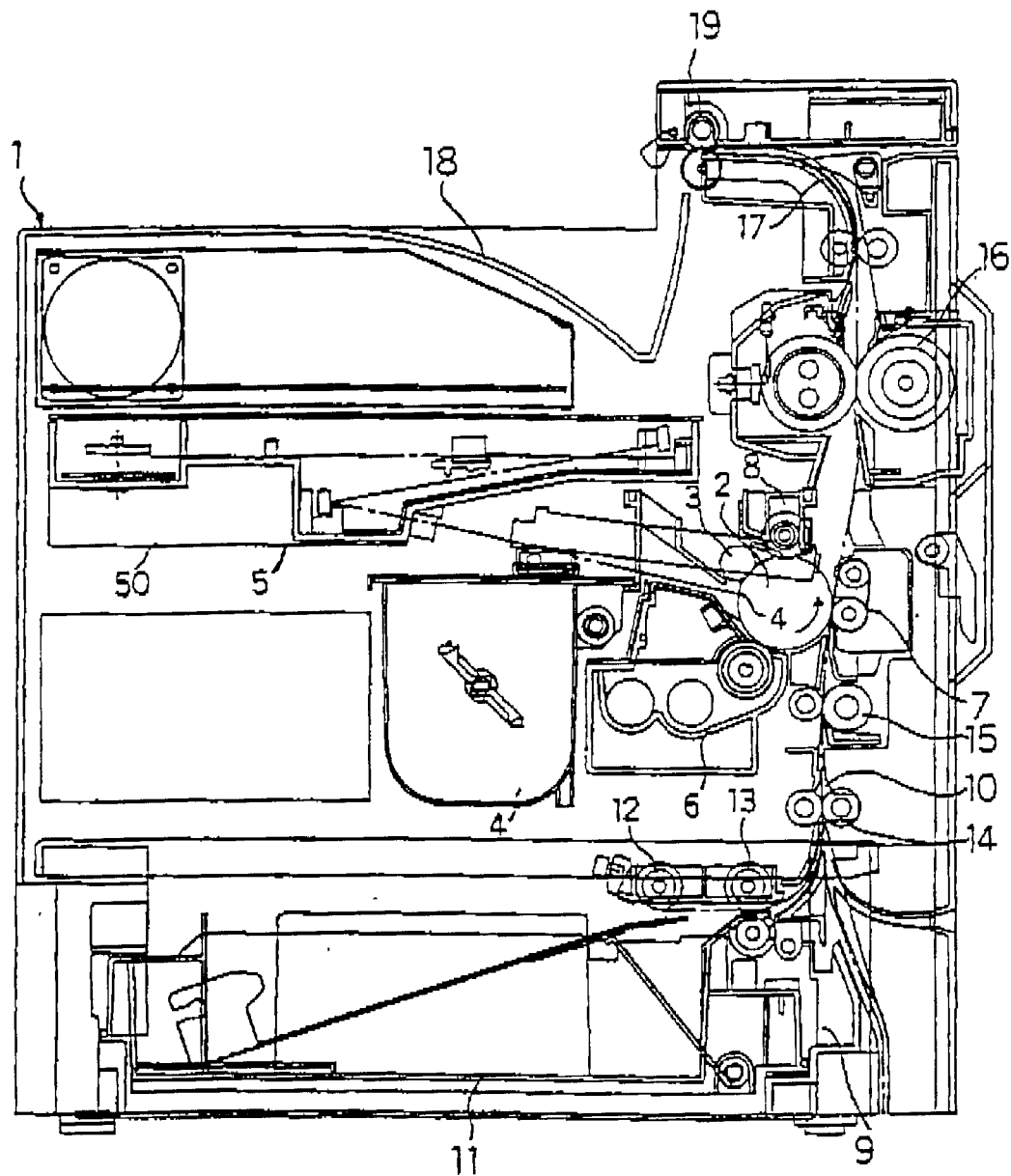
FIG. 5 is a view showing the internal structure of a laser printer that is an image forming apparatus according to the invention in which the electrophotographic technique is employed, and an image is written by a laser scanning device.

FIG. 5 is a view showing the whole of the internal structure in a state where components constituting the image forming apparatus are accommodated and held in a space ensured by the support structure shown in FIGS. 1 and 2.

First, the configuration of the image forming apparatus of the invention will be described with reference to FIG. 5. The image forming apparatus as shown in FIG. 5 is a laser printer 1. The laser printer 1 comprises an electrophotographic process section having components which are used for image formation, and which are arranged around a drum-like photoconductor 2 that is disposed in a substantially center area of the right side, and that serves as an image carrier. The electrophotographic process section will be briefly described. The electrophotographic process section includes the photoconductor 2, and the following components which are sequentially arranged; a charging roller 3 which uniformly charges a surface of the photoconductor 2, a laser scanning device 5 by which an exposure point 4 on the surface of the uniformly charged photoconductor 2 is irradiated with a light image of a laser beam, a developing unit 6 which visualizes an electrostatic latent image formed on the surface of the photoconductor 2 by the light image exposure, by means of a developing agent such as a toner, a transferring unit 7 which transfers the toner image that is reproduced on the surface of the photoconductor after the development, onto a sheet which serves as a recording medium, and a cleaning device 8 which removes a toner remaining on the surface of the photoconductor after the transfer.

In the electrophotographic process section, in order to enable the user to easily carry out maintenance, particularly, the photoconductor 2, the charging roller 3, and the cleaning device 8 are supported by a single supporting member and integrated as a replacement unit. The replacement unit is used as aphotoconductor unit, and, in accordance with the life period of the photoconductor, replaced with a new photoconductor unit. The photoconductor unit includes at least the photoconductor 2, and may further include the transferring unit 7 and the like. Alternatively, the unit may be configured so as to omit the cleaning device 8.

In addition to the photoconductor unit, the developing unit 6 may be singly configured as a replacement unit so that, in accordance with the life period of a developing roller constituting the developing unit or the like, the replacement unit is replaced with anew replacement unit. In the developing unit 6, a toner supplying unit 4 which supplies the toner into a developing chamber having the developing roller of the developing device is disposed so as to be detachable with respect to the developing unit. Therefore, the developing unit 6 including the toner supplying unit 4 can be attached to and detached from the laser printer body 1.

A sheet feeding section 9 which is inner packaged in the apparatus body (a state where the section is accommodated within an installation area without protruding from the apparatus body), and which houses sheets which serves as recording media is disposed below the electrophotographic process section. A sheet transporting path 10 is disposed between the sheet feeding section 9, and a transfer position where the photoconductor 2 of the electrophotographic process section is opposed to the transferring unit 7.

Therefore, a sheet fed by the sheet feeding section 9 is transported to the transfer position through the sheet transporting path 10. In the position, a toner image is transferred to the sheet by the function of the transferring unit 7. The sheet feeding section 9 comprises a sheet cassette 11 which accommodates sheets of a predetermined size, a sheet feeding roller 12 which feeds a sheet in the sheet cassette, and a separating roller 13 which prevents the sheets from being overlappingly fed, so as to feed the sheets one by one. The sheet transporting path 10 comprises a transporting roller 14 which transports each fed sheet, and a registration roller 15 which controls the start of transportation of a sheet to the transfer position so as to coincide with the front end of the developed toner image.

In order to enable replenishment of sheets and change of the sheet size, the sheet cassette 9 is disposed so as to be drawable and detachable with respect to the printer body 1.

A fixing device 16 for fixing the unfixed toner image is placed above the electrophotographic process section and in the path through which the sheet bearing the transferred toner image is passed. The fixing device has a well-known configuration, or consists of a heat roller that is heated and controlled to a temperature at which the toner melts, and a pressurizing roller that presses the sheet against the heat roller to fix the toner image transferred onto the sheet by means of heat and pressure.

The sheet which has passed through the fixing device 16 is discharged via a discharging path 17 placed above the fixing device 16, onto a discharge tray 18 which is disposed outside the printer body 1. The sheet is discharged onto the discharge tray 18 by a discharging roller 19 placed in an end portion of the discharging path 17.

On the other hand, as shown in FIG. 4, for example, the laser scanning device 5 according to the invention comprises an optical system including: a semiconductor laser 51 which emits a laser beam modulated in accordance with image data sent from another external device; a polygon mirror 52 which deflects the laser beam at a constant angular velocity; an F-θ lens 53 which corrects the laser beam that has been deflected at a constant angular velocity, so as to be deflected at a constant angular velocity on the photoconductor 2 constituting the electrophotographic process section; and a return mirror 54 which reflects the laser beam toward the exposure point 4 on the photoconductor 2. The semiconductor laser 51 is ON-OFF driven in accordance with the image data to emit a light image of the modulated laser beam.

A detection sensor 55 is disposed in order to check the scanning starting position before the irradiation of the photoconductor 2 with the laser beam. In order to guide the laser beam to the detection sensor 55, a reflecting mirror 56 is placed in a position outside a laser scanning region. In response to a detection of the laser beam by the detection sensor 55, the start of a writing process by the laser beam, i.e., the start of exposure of the photoconductor 2 to the laser beam is controlled. The center of the polygon mirror 52 which deflects the laser beam is directly coupled to the rotation shaft of a motor 57 so that the mirror is rotated at a constant velocity. The optical components are supported by a supporting member 50 while predetermined mutual positional relationships among the optical components are maintained.

As shown in FIG. 4, the optical components including the semiconductor laser 51 are supported on the same supporting member 50, and disposed as a single laser scanning unit. The supporting member 50 is supported by a frame structure according to the invention and constituting a supporting structure which will be described later. In the supporting member 50, oblong holes 48 for positioning and fixing the member to a predetermined position are formed in the four corners, so that the member is configured so as to be fixed by means of screws or the like.

In the space between the laser scanning device 5 and the discharge tray 18, arranged are control boards such as: a process control unit (PCU) board which controls the whole printer including the electrophotographic process section; an interface board which receives image data transferred from the outside of the printer; an image control (ICU) board which performs a predetermined image process on the image data sent from the interface board, i.e., converts the image data to those which can be processed by the printer, and which performs laser beam scanning via the semiconductor laser; and a power source unit which supplies a power to these boards and the other components such as the electrophotographic process section.

The printer 1 is connected to an image processing apparatus such as a personal computer, and functions as a printer which reproduces and outputs image data supplied from the image processing apparatus. The printer can be used also as a facsimile apparatus which receives image data transmitted through a telephone line and reproduces and outputs the image data. When the printer is connected to a scanner or the like which optically reads an image of an original, the printer can be used also for performing a copying function to reproduce and output the read image data.

In FIG. 5, one sheet feeding section 9 is disposed in the lower portion. Another sheet feeding section may be further disposed to be stacked below the one sheet feeding section, so as to cope with a plurality of sheet sizes. For the sake of a simplified description, in FIG. 5, only an image forming apparatus comprising minimum required devices for functioning as a printer is shown.

First Embodiment of the Invention

Next, a first embodiment of the invention will be described. In the first embodiment, a frame configuration which is a supporting structure for obtaining a laser printer such as shown in FIG. 5 which serves as an image forming apparatus will be described.

Particularly, the components constituting the above-described printer are attached via a holding member, an attaching plate, or the like into the space ensured by the frame structure shown in FIGS. 1 and 2. In order to enable the photoconductor unit which is a replacement unit including at least the photoconductor 2, to be attached to and detached from the printer body 1, the front face of the frame structure in FIGS. 1 and 2 is opened, thereby facilitating the attaching and detaching works.

Referring to FIGS. 1 and 2, the configuration of the frame structure according to the invention will be described. The frame structure 20 according to the invention has a basic configuration consisting of front and rear frames 21 and 22 each of which is configured, for example, by combining a plurality of square pipes (e.g. four). The front and rear frames 21 and 22 are coupled to each other by square pipes 23 and 24. In the frame structure 20, the square pipes including those of the front and rear frames 21 and 22 are coupled to one another by welding or other means.

Since the basic frame structure 20 such as shown in FIG. 2 is used, an opening 25 through which the photoconductor unit is to be attached and detached, for example, from the side of the front frame 21 can be formed. A front door which can be closed so as to cover the opening is disposed. The front door serves also as a part of an outer case (not shown). In the frame structure 20 shown in FIG. 20, rod-like members which serves as a framework are configured by using square pipes. Alternatively, rod-like members which are configured by a processed sheet metal, and which function as a framework may be used, For example, also members having a U-like, L-like, or O-like section shape may be used.

In the frame structure 20 having the structure shown in FIG. 2, the front and rear frames 21 and 22 are coupled to each other by the connecting square pipes (rod-like members) 23 and 24, to ensure the space surrounded by the square pipes. The strength and rigidity cannot be sufficiently ensured by coupling the front and rear frames to each other by the connecting square pipes 23 and 24. In the invention, therefore, a reinforcing member 26 which is made of a rigid material, and which functions as a first reinforcing member is fixed by screws or the like between the front and rear frames 21 and 22. For example, the reinforcing member 26 is configured by a flat plate of a thickness of about 1.6 mm, or a flat plate of a thickness of about 1.0 mm in which the strength is enhanced by a drawing process.

The both end portions of the reinforcing member 26 are bent. As shown in FIG. 3A which is a section view taken along line A—A of FIG. 1, the bent portions are fixed by screws to the square pipes of the front and rear frames 21 and 22. Alternatively, fixation of the bent portions may be performed by welding or other means in place of screws.

The reinforcing member 26 is attached and fixed to a portion where the strength of the frame structure 20 can be compensated. In the frame structure 20 shown in FIG. 2, lower portions of the front and rear frames 21 and 22 are coupled to each another by the connecting square pipes 23 and 24, and hence the strength in the lower portion is ensured. Therefore, the reinforcing member 26 is fixed to upper portions of the front and rear frames 21 and 22. Namely, the reinforcing member 26 is fixed to upper square pipes 21-1 and 22-1 of the front and rear frames 21 and 22, whereby the strength and rigidity of the frame structure 20 can be enhanced.

The electrophotographic process section which has been described with reference to FIG. 5 is accommodated in a center portion of the space in the frame structure 20 which is enhanced in rigidity by attaching and fixing the reinforcing member 26 as shown in FIG. 1. The sheet feeding section 9 shown in FIG. 5 is accommodated in a lower portion of the frame structure 20. In order to accommodate and hold the members, holding members or the like are adequately attached to the frame structure 20. In the frame structure 20 shown in FIG. 1, spaces for accommodating components disposed in the upper portion, namely, the fixing device 16, the discharging path 17, and discharging rollers 19 which are shown in FIG. 5 are not ensured. These upper components including the fixing device 16 are accommodated in another frame structure which is additionally disposed.

Therefore, holding members, attaching plates, and the like are disposed in the space ensured by the frame structure 20 so that the electrophotographic process section including the laser scanning device 5, the sheet transporting path 10, and the one sheet feeding section 9 are accommodated in the space, and the other supporting structure is disposed for the above-mentioned fixing device 16 and the like, thereby constituting the printer 1.

To comply with this, as described with reference to FIG. 4, the laser scanning device 5 of the electrophotographic process section which reproduces and outputs an image is configured as a unit in which the optical components including the semiconductor laser 51 are supported in the supporting member 50. As shown in FIG. 3A, the supporting member 50 is fixed by screws to the reinforcing member 26 according to the invention. Therefore, the supporting member 50 is fixed to the reinforcing member 26 which further enhances the strength and rigidity of the frame structure 20. Consequently, shake, distortion, and the like of the laser beam due to vibrations during the recording or reproducing operation of the printer 1 can be prevented from occurring. As a result, scanning of the photoconductor 2 with the laser beam can be appropriately performed, and the image quality can be prevented from being impaired.

Particularly, for each line, the laser scanning device 5 performs the scanning operation on the photoconductor 2 in the direction of the rotation axis (main scanning direction) via the polygon mirror 52, the F-θ lens 53, and the return mirror 54, by means of the laser beam which is modulated according to image data and emitted from the semiconductor laser that is turned ON-OFF in accordance with the image data. The laser beam emitted from the semiconductor laser 51 impinges on the photoconductor 2 via the above-mentioned optical components, and the optical components are disposed on the supporting member 50 in a state where their mutual positional relationships are correctly maintained. When the photoconductor 2 is scanned with the laser beam in a state where the mutual positional relationships of the optical components are maintained, a satisfactory reproduced image can be recorded.

Therefore, the optical components including the semiconductor laser 51 of the laser scanning device 5 are supported by the supporting member 50 while their mutual positional relationships are maintained, and the supporting member 50 is not attached and fixed directly to the frame structure 20 according to the invention, but attached and fixed to the reinforcing member 26 which reinforces the rigidity and the like of the frame structure 20. According to this configuration, the frame structure 20 is reinforced by the reinforcing member 26, vibrations due to the recording operation are not transmitted to the supporting member 50, distortion and misalignment of positional relationships among the optical components for laser scanning in the supporting member 50 are prevented from occurring, and the photoconductor 2 can be scanned by the laser beam in a satisfactory state. Therefore, the image quality can be effectively prevented from being lowered.

In the supporting member 50 which supports the optical components constituting the laser scanning device while maintaining their predetermined positional relationships, usually, a part of the member, or one upper face in FIG. 4 is opened in order to improve the workability in a process of integrating the optical components. The optical components are integrated into the supporting member 50 through the opened face. The opened face of the supporting member 50 is opposed to the reinforcing member 26 so that the opened portion is hermetically sealed by the reinforcing member 26 which reinforces the frame structure 20 according to the invention, and the supporting member is fixed thereto by screws or the like. As a result, the supporting member 50 is not required to have a special configuration for integrating the optical components. Since the opened portion can be sealed by the reinforcing member 26, dust and the like are prevented from entering the supporting member 50 and adhering to the optical components to disturb the laser beam.

As described above, for the frame structure 20 configured by columnar members (rod-like members) as a framework, the reinforcing member 26 which is the first reinforcing member for further enhancing the strength and rigidity and configured by a single rigid member is disposed, and the laser scanning device 5 is attached to the reinforcing member 26. Since the laser scanning device 5 is disposed on the reinforcing member 26 which reinforces the frame structure 20, it is not necessary to specially dispose a reinforcing member dedicated to the laser scanning device 5, and support and fix a frame which is ensured in strength.

Second Embodiment of the Invention

In the first embodiment described above, the first reinforcing member 26 configured by a single rigid member is disposed so as to reinforce the frame structure 20, and the laser scanning device 5 is attached and fixed to the reinforcing member 26, whereby shake and distortion of the laser beam are prevented from occurring, so as to maintain a satisfactory image quality.

On the other hand, with respect to also the photoconductor 2 which is to be exposed and scanned by the laser beam from the laser scanning device 5, the positional relationships with the laser scanning device 5 must be naturally maintained. In other words, when the positional relationships are once broken, satisfactory scanning exposure may not be performed and hence a resulting image may be distorted, In the second embodiment, therefore, a supporting structure in which positional relationships between the photoconductor 2 and the laser scanning device 5 are maintained and more satisfactory scanning exposure is enabled will be described.

As shown in FIG. 1, a second reinforcing member 27 is fixed to lower portions of the upper square pipes 21-1 and 22-1 constituting the front and rear frames 21 and 22 of the frame structure 20. The second reinforcing member 27 is used also as a support guide which enables attachment and detachment of a photoconductor unit constituting a replacement unit having at least the photoconductor 2. This will be described in detail later. In the second reinforcing member 27 also, particularly, a guiding portion 28 functioning as a guiding member for enabling replacement of the photoconductor 2 is disposed. The guiding portion is configured by a flat plate of a thickness of about 1.6 mm and made of a rigidmaterial, or a flat plate of a thickness of about 1.0 mm in which the strength is enhanced by a drawing process. The guiding portion 28 is formed by appropriately bending the second reinforcing member 27.

The second reinforcing member 27 is fixed to the lower portions of the upper square pipes 21-1 and 22-1 of the front and rear frames 21 and 22 by screws, welding, or other means. The second reinforcing member 27 is fixed also to the first reinforcing member 26. The fixation state is shown in FIG. 3B which is a section view taken along line B—B of FIG. 1. According to this configuration, the strength and rigidity of the frame structure 20 can be further enhanced. Moreover, the positional relationships between the laser scanning device 5 fixed to the first reinforcing member 26, and the photoconductor 2 (photoconductor unit) which is supported by the second reinforcing member 27 and which will be described later can be ensured in a predetermined state. Therefore, the photoconductor is scanned in the main scanning direction under an ideal state by the laser beam of the laser scanning device 5, so that satisfactory image formation is performed without lowering the image quality.

Referring to FIG. 3B, in the first reinforcing member 26, a portion elongating in the main scanning direction of the laser beam is bent, and the bent face is formed as a fixing face 26-1. In the second reinforcing member 27 also, a portion elongating in the main scanning direction of the laser beam, i.e., the direction of the rotation axis of the photoconductor 2 is integrally formed as a fixing face 27-1, and placed so as to be opposed to the fixing face 26-1.

The fixing faces 26-1 and 27-1 of the first and second reinforcing members 26 and 27 are fixed to each other by screws or the like while being opposed to each other. As a result of such fixation, the torsion strength and rigidity of the frame structure 20 are enhanced as described above. At the same time, the positional relationships between the laser scanning device 20 and the photoconductor 2 can be maintained to the predetermined state. As a result, the line in the main scanning direction along which the laser beam of the laser scanning device 20 is moved, and that along which scanning by the laser beam is performed can be maintained to parallel relationships with respect to the rotation axis of the photoconductor. Therefore, positional relationships for ideal scanning can be maintained, and hence a satisfactory image which is free from distortion can be reproduced.

Next, the photoconductor 2 supported by the second reinforcing member 27 will be described. In the invention, the photoconductor 2 is rotatably supported by a well-known second supporting member which is not shown. At least the photoconductor 2 is supported by the second supporting member. In addition, also the charging roller 3, the cleaning device 8, and the like which are shown in FIG. 5 may be supported by the second supporting member. When the photoconductor 2 is supported by the second supporting member in this way, the work of replacing the photoconductor 2 with a new one in accordance with the life period of the photoconductor is facilitated.

Figure 6A:
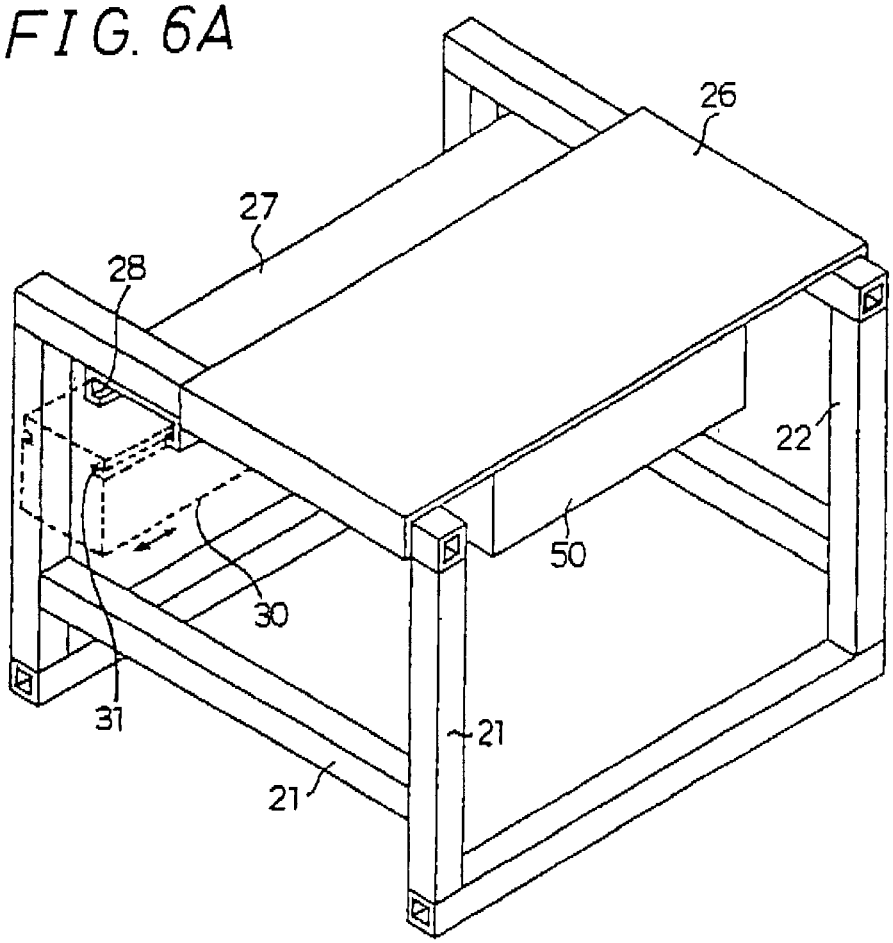
FIGS. 6A and 6B show an example of a structure for, in a frame structure according to the invention, detachably supporting a second supporting member which supports a photoconductor which serves as an image carrier in the second embodiment, onto the frame structure, FIG. 6A being a perspective view, and FIG. 6B being a section view.
Figure 6B:
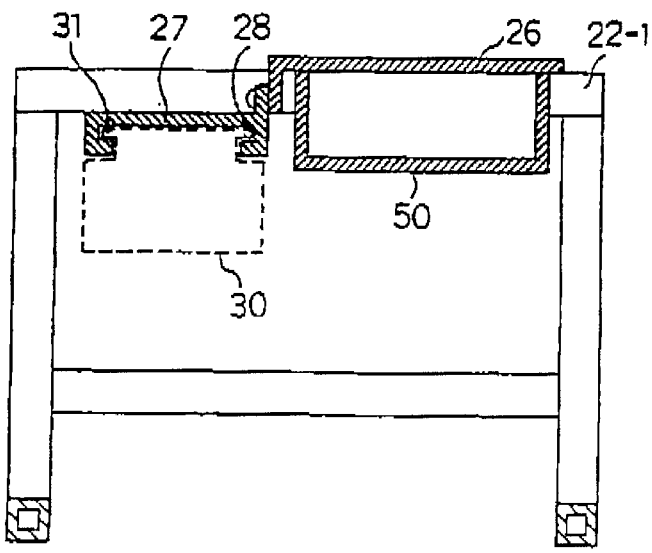

Therefore, the second supporting member supports the photoconductor 2, and is configured as a replacement unit. As shown in FIGS. 6A and 6B, for example, the second supporting member 30 supporting the photoconductor 2 comprises a guided portion 31 which is guided and supported by the guiding portion 28 disposed on the second reinforcing member 27. As well known in the art, the second supporting member 30 rotatably supports at least the photoconductor 2. In addition to the photoconductor 2, as required, the charging roller 3, the cleaning device 8, and the like may be integrally supported by the second supporting member 30.

The photoconductor 2 and the like constituting a replacement unit are unitized by the second supporting member 30. As shown in FIGS. 6A and 63, the second supporting member 30 can be drawn out or attached in the direction of the arrow while the guided portion 31 is guided by the guiding portion 28 disposed on the second reinforcing member 27. When the life period of the photoconductor 2 is ended, the printer body 1 informs it to the user by means of, for example, a display indicating replacement. Therefore, the user opens the front door of the printer body 1 to set the state shown in FIG. 6A. Then, the second supporting member 30 is drawn out toward the front side to be detached from the printer body 1, and the second supporting member 30 which supports a new second supporting member 30 is attached to the inner side while the guided portion 31 is inserted into the guiding portion 28 of the second reinforcing member 27. In this way, the replacement work can be easily performed.

In the invention, since the frame structure 20 in the invention is configured by combining the rod-like columnar members, the opening 25 through which the second supporting member 30 configuring a replacement unit is to be attached to and detached from the printer body 1 can be easily formed. Since the guiding portion 28 to which the second supporting member 30 which serves as a replacement unit is attached to be supported and guided thereby is disposed on the second reinforcing member 27 which reinforces the frame structure 20, moreover, the positioning of the photoconductor 2 can be ensured.

As described above, the positional relationships between the photoconductor 2 which is rotatably supported by the detachable second supporting member 30, and the laser scanning device 5 are maintained by the first and second reinforcing members 26 and 27. Therefore, also the predetermined positional relationships can be maintained without being disturbed by exposure scanning with the laser beam.

As described above, the frame structure 20 in the invention which ensures the space for accommodating and holding the components constituting the image forming apparatus are ensured by combining rod-like members, and the laser scanning device 5 is disposed on the reinforcing member 26 which reinforces the frame structure 20. Furthermore, the second reinforcing member 27 which reinforces the frame structure 20 is disposed. Also the photoconductor 2 which serves as an image carrier which is exposure scanned with the laser beam from the laser scanning device 5 to reproduce an image corresponding to image data is supported by the second reinforcing member 27. According to this configuration, positioning by which the laser scanning device 5 and the photoconductor 2 are set to predetermined relationships is satisfactorily maintained, and misalignments and distortion due to vibrations are eliminated, so that a reproduced image can be provided in a satisfactory state.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image forming apparatus comprising:

an image carrier which is optically scanned with a laser beam that is modulated in accordance with image data, for reproducing an image corresponding to the image data thereon;

a laser scanning device having optical components, for scanning with the laser beam;

a frame structure for supporting the image carrier and the laser scanning device;

a first reinforcing member attached to a portion where the frame structure is reinforceable in strength, for supporting the laser scanning device; and a first supporting member for holding the laser scanning device when the first supporting member is affixed to the first reinforcing member.

2. The image forming apparatus of claim 1, wherein the first supporting member includes one face which is opened so that predetermined mutual positional relationships among the optical components constituting the laser scanning device are maintained, and the first supporting member is fixed so that the opened face is opposed to the first reinforcing member.

3. The image forming apparatus of claim 1, wherein the frame structure has a basic configuration in which front and rear frames each configured by combining a plurality of rod-like members are coupled with each other by rod-like members to ensure a space which can accommodate components of the image forming apparatus, and the reinforcing member is disposed between the front and rear frames.

4. The image forming apparatus of claim 1, wherein a second reinforcing member is further disposed in a same manner as that of the first reinforcing member, and a second supporting member for supporting the image carrier is disposed on the second reinforcing member.

5. The image forming apparatus of claim 4, wherein a guiding portion for guiding the second supporting member which supports the image carrier is disposed in the second reinforcing member, a guided portion which is guided by the guiding portion is disposed in the second supporting member, and the second supporting member is detachable and attachable.

6. The image forming apparatus of claim 4, wherein the second reinforcing member is fixed to the first reinforcing member so that a face of the first reinforcing member corresponding to a laser beam scanning direction is fixed to a face of the second reinforcing member corresponding to the laser beam scanning direction.

* * * * *